Feb. 7, 1928.
W. M. AREHART
1,658,070
PROCESS FOR TREATING PLASTIC BARS
Original Filed June 28, 1923   2 Sheets-Sheet 2
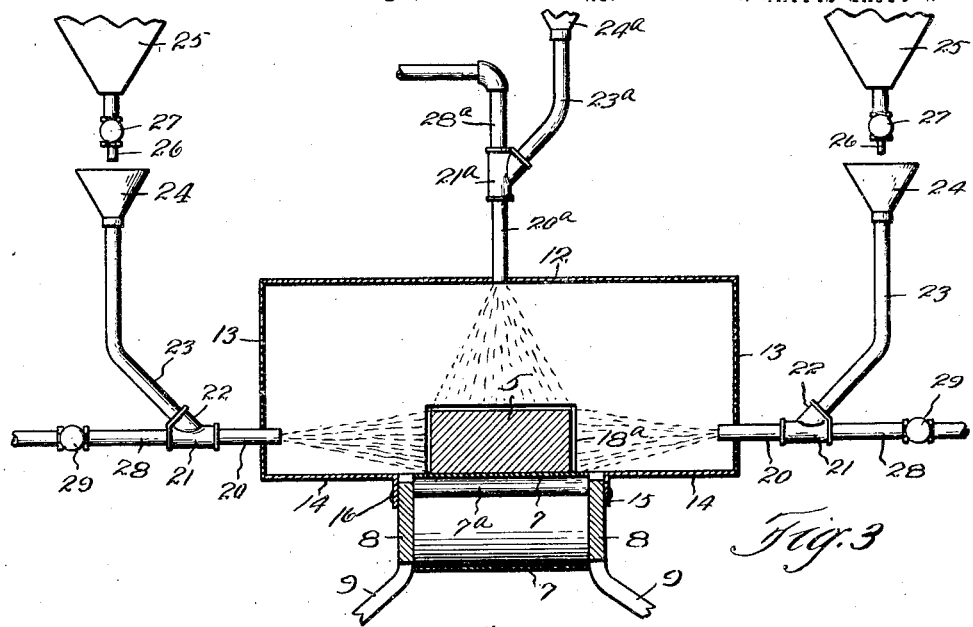
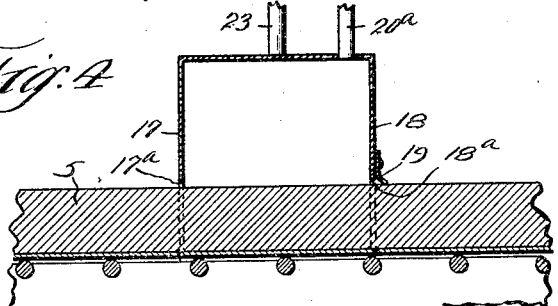
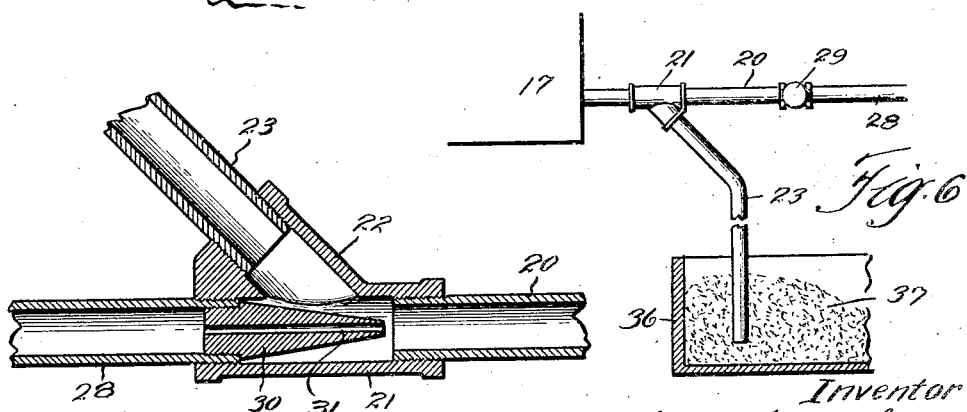

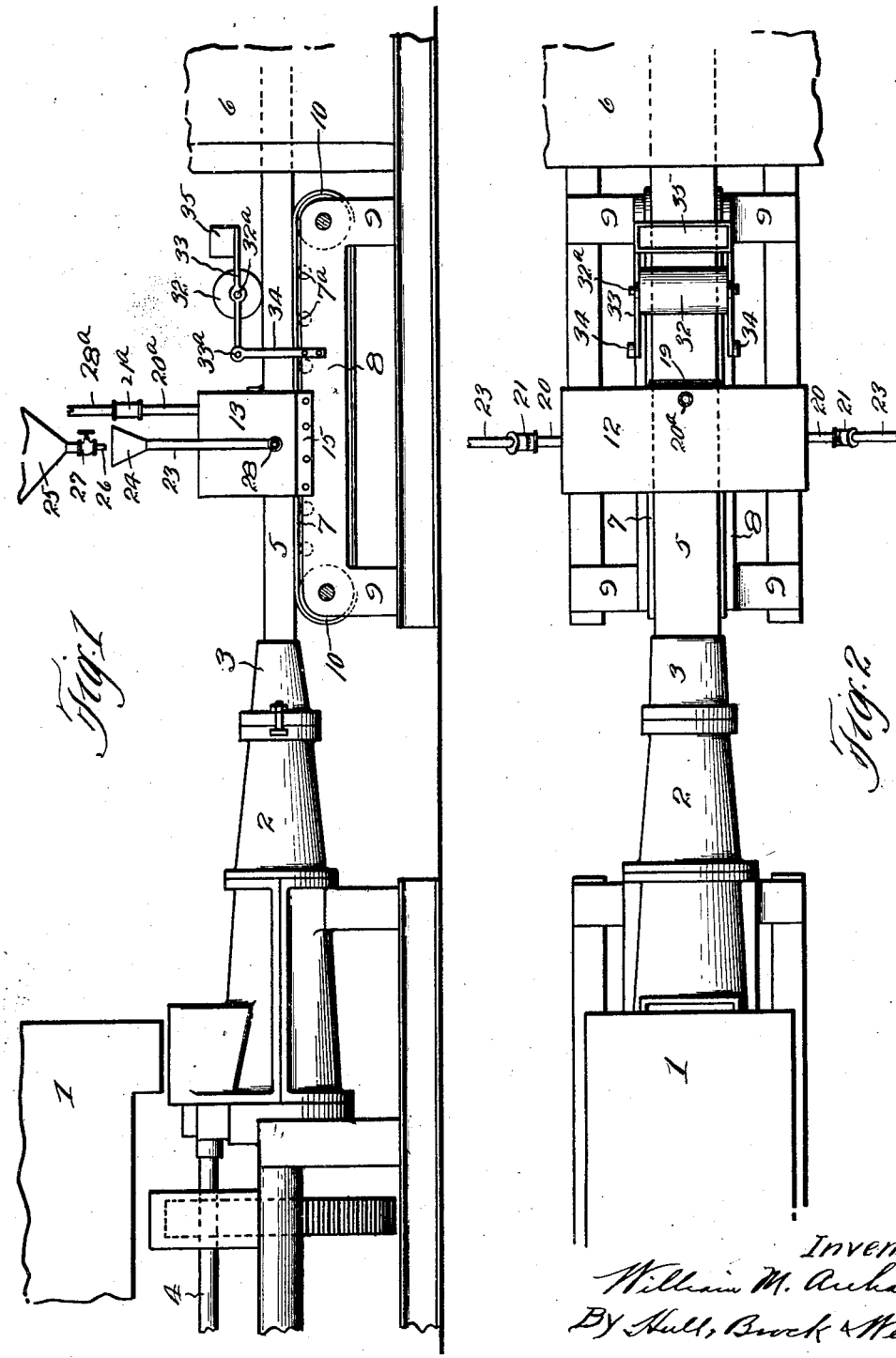

Patented Feb. 7, 1928.

1,658,070

UNITED STATES PATENT OFFICE.

WILLIAM M. AREHART, OF EUCLID VILLAGE, OHIO.

PROCESS FOR TREATING PLASTIC BARS.

Application filed June 28, 1923, Serial No. 648,214. Renewed December 16, 1927.

This invention relates to a process, for applying sand (or other finely divided material) to the unburned clay bars that are pressed through the die of a stiff-mud auger machine. It is the general purpose and object of this invention to provide a process whereby the sand may be applied to these bars, and preferably prior to the cutting operation and while the bars are in transit to the cutting reel; also to enable this operation to be realized in an extremely convenient, economical, and efficient manner.

I accomplish the foregoing objects in and through the construction and arrangement of parts shown in the drawings forming part hereof, wherein Fig. 1 represents, somewhat diagrammatically, a side elevation of part of a pug mill, an auger machine, a conveyor, and a portion of the cutting reel, illustrating the manner in which my invention cooperates with the bar and its relation to the other parts of the apparatus; Fig. 2 is a plan view of the parts shown in Fig. 1; Fig. 3 a transverse sectional view through the central portion of my apparatus and the parts associated therewith; Fig. 4 a central vertical section, taken at right angles to Fig. 3; Fig. 5 a sectional detail through the injector nozzle by which the sand is supplied to the bar; and Fig. 6 a detail in plan of a modification of the means for supplying sand to the injector and to the housing for the bar.

Describing the various parts by reference characters, 1 denotes the rear or delivery portion of an ordinary pug mill and 2 denotes generally the auger machine, having the shaping die 3 at the delivery end thereof, and through which machine the stiff mud, delivered from the pug mill, is fed in the ordinary manner by a screw or auger (not shown), driven from a shaft 4. The parts referred to constitute in their details no part of my invention and may be of any standard construction.

The die 3 is so shaped that the stiff clay mud is delivered therefrom in the form of a rectangular bar, indicated at 5, which bar is delivered onto the ordinary measuring belt and from the said belt to the ordinary cutting reel, a portion of which reel is indicated at 6. The measuring belt comprises an endless belt 7, the upper portion of which is supported by rollers 7ª mounted in side plates 8 carried by standards or uprights 9. The belt is supported at its ends by pulleys or rollers 10 mounted in the uprights 9.

As the bar 5 runs along with the belt 7, it passes through a housing, indicated generally at 11. This housing, shown as generally rectangular in shape, comprises a top 12, sides 13 and bottom portions 14 extending inwardly from the sides 13 and having downturned flanges 15 by means of which the housing is riveted, or otherwise secured, to the side plates 8, as shown at 16. In addition to the top, bottom, and side walls, the housing is provided with a front wall 17 and a rear wall 18, each having an opening therein of sufficient size to permit the passage of the bar therethrough. These openings are indicated at 17ª and 18ª. The rear wall 18 has secured thereto a flap 19, of leather or similar material, which is adapted to drag upon the top of the bar as the latter is fed through the housing; the object of this will be explained hereinafter.

Projecting into the sides 13 are the pipes 20, the pipes being located midway of the length of each side and preferably slightly below the vertical center thereof. Each pipe is connected with an elbow 21, which constitutes an injector housing, each elbow being provided with an inclined connection 22 into which there is threaded a pipe 23, which is adapted to receive sand or other finely divided material. In Figs. 1-5 inclusive, this pipe is shown as extending upwardly and is provided with a funnel-shaped receptacle 24 at its upper end into which sand may be discharged from a hopper 25 through a delivery spout 26 having a gate, or similar valve 27.

Threaded into the rear end of each elbow 21 is a pipe 28 having a valve 29 and provided at its forward end with an injector nozzle 30 extending axially of the body portion 21 of the elbow, with its delivery end close to the receiving end of the pipe 20. This nozzle is provided with a central bore 31 through which steam (or other pressure fluid) may be delivered, thereby to drive sand, supplied through the pipe 23, into the housing 11.

Projecting into the rear central portion of the top of the housing is a pipe 20ª, leading from an injector elbow 21ª to which the pipes 23ª and 28ª are connected, the former having a funnel 24ª for sand. The parts 20ª to 28ª constitute a means for supplying sand (or other finely-divided material) to the top and rear portions of the housing, which means may be identical with that employed for supplying such material to each side of the housing. The pipe 20ª communicates with the rear of the top or cover of the housing for the purpose of securing complete and even distribution of the sand on top of the bar; as the bar travels toward the end of the housing with which the pipe 20ª communicates, the top of the approaching end of the bar is showered with sand and the entire upper surface of the bar is thoroughly coated.

With the parts constructed and arranged as described, the operation will be readily understood. As the bar 5 passes through the housing 11, sand is delivered forcibly and directly against the sides and top of the same. Where steam is used for the injecting fluid, it serves to soften the plastic, or semi-plastic, clay bar sufficiently to insure the adhesion of the sand thereto.

As the bar passes beneath the flap 19, the latter serves to scrape off sand that may be resting loosely thereon. The sand on the top of the bar may be embedded in the bar by means of a roller 32. This roller may be conveniently weighted in the manner shown in Figs. 1 and 2, wherein the roller is shown as journaled at 32ª in a pair of arms 33 each pivoted at its front end, as indicated at 33ª, to the upper end of a bar 34 secured to a side plate 8. Secured to the rear ends of the arms 33 is a box 35 which may be filled more or less with any weighting means, whereby the pressure of the roller on top of the bar 5 may be adjusted as the occasion may require.

From the roller 32, the bar is delivered to the reel 6 and there cut into lengths, in the usual manner.

In Fig. 6, I have shown a modification of the sand-feeding means wherein the sand-supply pipe 23 is led downwardly and into a box 36 containing the sand 37. By maintaining the lower end of the pipe 23 covered with the sand, the latter will be drawn upwardly by the injector action of the steam, and an apparatus equipped with this sand-feeding arrangement will operate in the same manner as described hereinbefore.

While I have referred generally herein to sand as the material applied to the top and sides of the bar 5, it will be evident that other finely-divided matter may be substituted therefor.

Having thus described my invention, what I claim is:—

The process of applying the finely-divided material to a bar of plastic material which comprises first supplying the finely-divided material to the said bar by means of a steam injector, whereby the bar is maintained in an adhesive condition and the finely-divided material may be caused to adhere thereto and second embedding such material into the bar.

In testimony whereof, I hereunto affix my signature.

WILLIAM M. AREHART.